Patented Oct. 27, 1936

2,059,110

UNITED STATES PATENT OFFICE 2,059,110

PROCESS FOR MAKING HIGH GRADE SACCHARINE PRODUCTS AND REFINING RAW SUGARS

John P. Ioannu, Philadelphia, Pa., assignor to Pennsylvania Salt Manufacturing Company, Philadelphia, Pa., a corporation of Pennsylvania No Drawing. Application March 6, 1935, Serial No. 9,659

9 Claims. (Cl. 127—48)

My invention relates to a process of treating saccharine liquors, and more particularly it relates to a process for the decoloration and purification of sugar liquors of any degree of purity by which the defecation and clarification thereof may be carried out in a more efficient and economic manner.

One object of the present invention is to provide a process by which the purification steps employed in the refining of saccharine liquors may be greatly simplified, which process may be applied to a liquor containing any kind of sugar, or mixture of sugars, irrespective of the origin thereof.

Another object of the invention is to improve the defecation and clarification steps of refining sugar liquors, irrespective of the composition peculiarities of the raw material used in preparing the liquors, to such an extent that the filtration rate of the liquors treated by the process is greatly increased as compared to the filtration rates of the processes now in current use.

A further object of the present invention is to provide a method of handling and treating sugar liquors in a single continuous treatment with the use of certain reagents in order to manufacture white sugars of refiners' grade by a more efficient and technically correct procedure.

Still another object of the process is to produce sugar liquors of such a whiteness of color, brilliancy, and purity that they can be directly used, without additional processing, for boiling white crystals sugar and hence to permit the cane-sugar mills to manufacture white crystals sugar directly without the necessity of employing the well known refining processes.

Another object is to improve the defecation-carbonation process of the beet-sugar works by shortening the number of steps and bettering the color, brilliancy, and quality of the liquors.

A further object of the process is to increase the life, efficiency, and hours of service of the bone black and vegetable carbon filters commonly used in sugar refining and to permit the use of a larger number and variety of adsorbing materials by the refiners, if desired.

Another object of the present invention is to improve the flow-sheet of the refinery by causing the elimination of a material number of passages through the adsorbing columns, the diminution of the volume of sweet waters, and the more efficient handling of cut-offs and residual syrups and molasses.

Other objects will be apparent from a consideration of the specification and claims to those familiar with the treatment, handling, and refining of sugar liquors and products. The present invention affords a multiplicity of short-cuts in the handling of refinery liquors and syrups, and because of the new properties developed in the liquors obtained by the process, the sugar refiner can easily revamp the flow-sheet of operations in a more efficient way and take better care of the different types of raws on hand, and thus manufacture the type or types of products needed with substantial saving of time, fuel, and labor.

The process of the present invention is applicable for the treatment of all kinds of sugar liquors, irrespective of their natural or artificial origin, and it applies to mono- and di-saccharide liquors, to hydrolysates from polysaccharides, and to liquors containing variable proportions of these different kinds of sugars. For example, it may be employed with liquors containing cane, beet, maple, invert, malt, and milk sugars and the sugars derived from starch, corn, potato, artichoke, tuber, sorgho, and the like. The process may be carried out with the raw juices from plants, or hydrolysates from plant parts, or purified juices of any degree of purity, or by-product juices, or melts, liquors and cut-offs or syrups, or molasses.

The process of the invention may be carried out with liquors of varying concentrations, but in general, liquors containing 50% to 70% solids are preferred. The process is applicable for the treatment of liquors having wide variations in hydrogen ion concentration. As will be hereinafter pointed out, the system used for the treatment, once the characteristics of the liquors are taken into account, can be adjusted to give treated liquors with any desired concentration of hydrogen ions between the limits of $10^{-5}$ and $10^{-9.6}$. As a practical matter, the hydrogen ion concentration of sugar house refiners' solution is about $10^{-6}$ and that of cane sugar works slightly above $10^{-7}$. With solutions of beet sugar works, the solutions are always maintained on the alkaline side.

The present invention contemplates the decoloration of saccharine liquors and the formation of a stabilized, easily filtrable floc therein, by the combined addition to the solution of very small amounts of reagents capable of decolorizing, of coagulating the natural and added impurities, of flocculating the precipitate formed, and of stabilizing the resulting floc by controlling the degree of peptization of the floc and by maintaining the hydrogen ion concentration at the proper and desired point. The floc formed is very complex in structure and may be considered to be an alumino-silicate, or an alumino-silico-phosphate, or a silico phosphate complex or mixtures thereof, containing by chemical binding, by adsorption, by base-exchange substitutions and/or by mechanical occlusion the organic and inorganic natural or added impurities of the liquor, generally known as non-sugars.

The decolorizing agent may be any inorganic or organic compound capable of liberating oxygen, directly or indirectly, in the solution, and thus exerting an oxidizing action on the impurities. Of the inorganic compounds, the hypohalites of the alkali, alkaline earth or metal elements, such as calcium hypochlorite; the peroxides and the persalts, such as hydrogen peroxide, calcium, barium, and strontium peroxide; and the persulphate, perborate, and persilicate salts may be mentioned. Certain of the compounds may, if desired, be formed in the solution, for example, hypochlorite may be obtained by passing chlorine gas into a suitable alkaline liquor. Satisfactory results are obtained by employing as oxidizing reagents, certain unstable compounds having the property of decomposing in contact with water and hydrolyzing into chlorine and an oxidizing radical, thus forming an internal oxide reducing system as nitrosylchloride, sulphuryl chloride or nitrogen trichloride. Of the organic oxygen-liberating compounds, the peroxides, such as benzoyl peroxide, urea peroxide, lauryl peroxide, and succinyl peroxide; and the mono- and di-chloramine derivatives, such as toluene sulphon chloramide or the di-chloramides of sulpho-benzoic acid may be cited as examples. Of these reagents, the alkaline earth compounds, particularly the calcium compounds, are to be preferred. Due to its availability and high oxidizing power, high purity calcium hypochlorite is a particularly satisfactory compound for use. Obviously, a mixture of two or more decolorizing or oxidizing agents may be utilized, if desired.

The reagent employed for bringing about the coagulation of the natural and added impurities and the flocculation of the precipitate may be any soluble aluminum salt, or any soluble silicate. A soluble aluminum salt of an acid stronger than carbonic, such as aluminum sulphate or aluminum chloride is particularly desirable. The flocculation of the alum precipitate is favorably influenced by the use of a basic aluminum sulphate, and preferably by adding to the sulphate a soluble aluminate. The aluminate in contact with water hydrolyses into two parts, each one ionizing in their turn and therefore behaving as independent units. Sodium aluminate for example when added to the liquor may be considered, and is, a mixture of aluminum ions, sodium ions and hydroxyl ions and has a high buffer value. The use therefore of a sodium or potassium aluminate either alone or preferably with aluminum sulphate or chloride, is equivalent to the use of a basic aluminum sulphate. The soluble aluminates are included herein in the term "soluble aluminum salt". Sodium silicate also functions to coagulate and flocculate the impurities in the saccharine liquors.

The reagent for stabilizing the floc by controlling the degree of peptization thereof and by maintaining the proper hydrogen ion concentration is a reagent which in solution hydrolyzes to give a basic reaction and hence acts as a buffer. The compound also contains a radical which is capable of entering into the floc complex. The stabilizing agent employed will depend on the particular coagulating and flocculating agent or agents employed; for example, when a soluble aluminum salt is used, a soluble silicate, such as sodium or potassium, and/or soluble basic phosphate, such as trisodium phosphate or sodium metaphosphate, give satisfactory results. When a soluble silicate is utilized to coagulate and flocculate the impurities, a basic soluble phosphate will function satisfactorily as the stabilizing agent.

The following combinations of reagents are examples of the various systems that may be employed:

(1) An organic or inorganic compound capable of reacting and giving directly or indirectly an oxidizing effect (calcium hypochlorite, calcium or hydrogen peroxide or a chloramine compound), aluminum sulphate or chloride, a soluble aluminate, and a soluble silicate;

(2) The reagents of (1) plus a soluble basic phosphate;

(3) An organic or inorganic compound capable of reacting and giving directly or indirectly an oxidizing effect (calcium hypochlorite, calcium or hydrogen peroxide or a chloramine compound), aluminum sulphate or chloride, a soluble silicate, and a basic soluble phosphate;

(4) An organic or inorganic compound capable of reacting and giving directly or indirectly an oxidizing effect (calcium hypochlorite, calcium or hydrogen peroxide or a chloramine compound), a soluble silicate, and a basic soluble phosphate.

(5) An organic or inorganic compound capable of reacting and giving directly or indirectly an oxidizing effect (calcium hypochlorite, calcium or hydrogen peroxide or a chloramine compound), an aluminum sulphate or chloride, and a soluble basic phosphate.

The reagents may be added simultaneously or one following the other, in dry powdered form, or in solution in water, sweet water, or sugar liquor. The reagents are added at any desired temperature between 30° C. and 80° C., but preferably they are added at about 45° C. to 50° C. The liquor is then well agitated, to insure thorough mixing, for approximately five minutes and the temperature is raised to suitable points, for example to 60° C. to 75° C., to produce "the break", i. e., a good floc formation in the liquor. The reagents are added in very small amounts; for example, satisfactory results are obtained by adding less than 1% of the reagents based on the weight of sugar solids in the liquor, although the amounts introduced into the solution are not critical. The amount of decolorizing reagent employed will depend on the grade of liquor being treated and the result desired, but in most instances about .5% of this reagent will be sufficient, although greater amounts will not react deleteriously. The other reagents may be added in even smaller proportions; for example, in most instances the total weight of other salts will be in the neighborhood of .1% to .2% based on the weight of the sugar solids in the solution.

While various chemicals have been suggested for use in the treatment of saccharine liquors, no process heretofore suggested for use obtains results that can be compared with those of the present process. The use of the system of reagents as described herein produces improved results that were up to the present time unknown in the technology of sugar purification. In the previous processes, the floc formed is of such a nature that the filtration rate is very substantially slowed down. Furthermore, these treated sugar liquors, particularly when processed with an acid phosphate or phosphoric acid require an extended period for settling to obtain complete clarification, and the defecates formed can only be filtered very slowly. In other suggested processes, the operations must be repeated many times, as is the case in carbonation processes, before the liquors become suitable for crystallization. Also the adjustment of the treated liquors to a suitable concentration of hydrogen ions is, in practice, a multiple stage operation.

In the process of the invention, all these disadvantages are overcome by the combined use of the decoloring agent, coagulating-flocculating agent, and the stabilizing agent. In most cases, is is unnecessary to hold the treated liquors for defecation and clarification for any length of time, but, on the contrary, the solutions may be filtered immediately after treatment. The treated liquors filter considerably faster, as determined by comparative filtration tests. The system, once the characteristics of the liquors are taken into account, can be adjusted to give treated liquors of any desired hydrogen ion concentration between the extremes of $10^{-5}$ to $10^{-9.6}$, but for practical operation, the hydrogen ion concentration of the system will be maintained between $10^{-6}$ to $10^{-9}$. Thus the treated liquors may be finished with a hydrogen ion concentration of $10^{-6.6}$ to $10^{-6.9}$, or frankly, on the alkaline side, e. g., $10^{-7.2}$ to $10^{-8.8}$, according to the requirements.

By the process, a liquor of especial properties is obtained after filtration, which liquor can be treated in the bone-black filters or adsorbing columns commonly used in refining with the result that the life, efficiency, and hours of service thereof are greatly increased. In fact, one column of char is able to handle three or four times larger volumes of liquor than previously. As a result of the treatment of the saccharine liquors as described herein, a larger number and variety of active-surface adsorbing materials may be used in place of the bone-black now exclusively employed by refiners. Vegetable carbons of the type having well defined, high adsorbing properties may be utilized, as may silica gel and activated aluminum oxides and compounds such as activated bauxite. The last named adsorbent is particularly active towards these solutions. Also certain base-exchange compounds of the alumino-silicate type, for example, ammonia zeolites, have been found to lower the cation content of the liquors and for this reason may advantageously be employed in place of or in addition to other adsorbing materials.

A method is provided by the invention for handling and treating sugar liquors in a continuous treatment for the manufacture of white sugars of refiners' grade in a more efficient and economic manner. The cane-sugar mills may by the process manufacture white crystals sugar or light colored and high quality by-product syrups and molasses directly without the necessity of installing the well known refining process now in use for refining raws. By the process, it is possible to obtain directly from the raws white, sparkling, high purity saccharine liquors and syrups suitable for the manufacture of sugar products and confections without the need of any additional refining by crystallization.

The process may be advantageously carried out in conjunction with the defecation-carbonation process of the beet-sugar works, in which case the reagents are added to the alkaline diffusion juices from beets, preferably limed, followed by the passage of carbon dioxide through the solution until an easily filtrable precipitate is formed. By this process, the number of steps is reduced and a bettering of the color, brilliancy, and quality of the liquors is obtained.

A variation of the procedure may be carried out by first bringing the raw liquors and melts to the proper hydrogen ion concentration by a preliminary addition of lime. Such a step is generally necessary when fermented or otherwise deteriorated sugars are worked into liquors which for industrial handling are dangerously acidic. Another method of adjusting the concentration of hydrogen ions to the desired point, is by adding to the raw liquors a portion of the defecation scums obtained from a previous operation with or without an additional amount of lime. The addition of the defecation scum offers the added advantage of favorably influencing the floc formation and of reducing the amount of chemicals needed for satisfactory treatment. In the case lime or defecation scum is added to adjust the pH index, the stabilizing agent added maintains the hydrogen ion concentration at the desired point.

The process may also be advantageously varied by passing sulphurous acid gas through an alkaline saccharine solution to which the reagents have been added. A very desirable floc is obtained by this treatment and the amount of oxygen-liberating compound may be decreased. The sulphurous acid gas, if employed, is preferably passed into the liquor through a diffuser so that the gas is brought into intimate contact with the solution. The necessary amount of sulphurous acid is added to bring the pH to a desirable level, such as 6.9 to 7.4. In the defecation-carbonation process, sulphurous acid gas may be passed into the solution as well as the carbon dioxide.

In a typical example, a washed sugar melt of 55% solids and a concentration of hydrogen ions of $10^{-6.2}$ to $10^{-6.4}$ is heated to 65° C.–70° C. Two parts of a decoloring, oxidizing agent, for example, calcium hypochlorite, .1 to .5 part of aluminum sulphate or chloride, .1 to .2 part of sodium aluminate, and .1 to .2 part of sodium silicate per 1,000 parts of solids are added to the heated solution. After thorough mixing, the treated liquor is filtered without loss of time on a filter press in the usual way with the usual amount of an inert material to aid the filtration. The liquors filter with considerable speed and come from the presses decolorized to a suitable point from water-white to a very pale yellow, depending upon the manufacturing needs, and are suitable for boiling directly white crystals sugar without further treatment. The filtered liquor may be passed through a bone-black column when a higher purity of the crystallization syrup and residual molasses is desired. The liquor thus treated is used for boiling sugar or for any other suitable purpose. The procedure may be varied by adding the chemicals to the liquor at 50° C. After thorough agitation, the liquor is then heated until a visible floc is formed, which rises to the surface when a temperature of 60° C. to 70° C. is reached. The heating and clarification takes, depending on the concentration and viscosity, only a fraction of an hour and when the separation is complete, a sparkling, clear liquor is obtained which is drawn from the blow-up in any convenient way. A rapid passage through suitable adsorbing surfaces capable of retaining cations may be desirable in order to provide a higher purity of the crystallization syrups and residual molasses.

In another example, to a properly limed beet diffusion juice (14-18 Brix) at a suitable temperature, e. g. 50° C., the reagents of the preceding example in the same proportions are added. Thereafter, carbon dioxide is passed into the solution until a precipitate is formed. After the carbonation, the temperature is raised to 65° C. to 70° C., or to the point at which a granular, easily filtrable precipitate is obtained. Generally, a single carbonation is sufficient, although the treatment may be divided into two or three steps, each followed by a carbonation step. The solution can also be treated with sulphurous acid gas, in which case it may be passed into the solution simultaneously with the carbon dioxide or the treatment with one gas may be followed by treatment with the other. Beet liquors thus treated can be used for the direct crystallization of sugars of high grade, suitable for direct consumption without the need of further refining.

In a further example 10 to 20 parts of an oxygen-liberating agent such as calcium peroxide, 1 to 2 parts of aluminum chloride, 1 part of sodium aluminate, and 1 to 2 parts of sodium silicate per 1,000 parts of solids in the solution are added to a raw sugar solution without any previous affination containing 50% to 80% solids. The liquor is heated to 55° C., and in less than one hour the liquor is defecated, clarified, and decolorized to water white. The supernatant defecation scums are separated from the solution by any convenient means and a clear, sparkling, water-white liquor is obtained which can be used directly for any suitable purpose as, for example, the manufacture of fondants and other confections.

In another example, a corn starch hydrolysate of approximately 45% reducing sugars, obtained at the first step of acid hydrolysis and adjusted to a concentration of hydrogen ions of about $10^{-6.4}$ is heated to 50° C.-65° C. To this solution, 5 to 10 parts of calcium hydrochlorite, 1 part of aluminum sulphate, .2 to .3 part of sodium aluminate, .1 to .2 part of trisodium phosphate, and .2 to .4 part of sodium silicate per 1,000 parts of sugar solids are added. The floc forms immediately and the solution is filtered on a suitable press. A rapidly filtering, sparkling, water-white liquor is obtained which can be acidified and submitted to a second conversion for complete hydrolysis to 95% to 98% reducing sugars. The second hydrolysate is treated in substantially the same manner as the first and the treated and filtered liquor is passed through suitable adsorbing agents, such as bone-black, vegetable carbon, activated aluminum oxides and their compounds, such as activated bauxite, silica gel, or base-exchange silico-aluminates. The liquor obtained is applicable for direct use in the arts, or for vacuum concentration and crystallization. In the above examples, 3 to 5 parts of hydrogen peroxide (30% grade) per 1,000 parts of sugar solids may be utilized in place of the oxidizing agent mentioned.

Considerable modification is possible in the steps of the process, and in the physical conditions employed, as well as in the amounts of reagents employed without departing from the essential features of the invention.

1. The process of purifying saccharine liquors containing the natural organic and inorganic impurities which comprises adding thereto an oxidizing compound capable of exerting a decolorizing action, a soluble aluminum salt to form a floc with the natural and added impurities, and a stabilizing agent for said floc to control the peptization thereof, said stabilizing agent being capable of hydrolyzing to give a basic reaction, and of reacting with the floc complex, said reagents being added to the liquor at substantially the same time, and in proportions to maintain the saccharine solution at a pH between 6 to 9, and thereafter removing the floc from the solution.

2. The process of purifying saccharine liquors containing the natural organic and inorganic impurities, which comprises adding thereto an oxidizing compound capable of exerting a decolorizing action, a very small amount of a soluble aluminum salt of an acid stronger than carbonic acid to form a floc with the natural and added impurities, and a stabilizing agent for said floc to control the peptization thereof, said stabilizing agent being capable of hydrolyzing to give a basic reaction, and of reacting with the floc complex, said reagents being added to the liquor at substantially the same time, and in proportions to maintain the saccharine solution at a pH between 6 to 9, and thereafter removing the floc from the solution.

3. The process of purifying saccharine liquors containing the natural organic and inorganic impurities, which comprises adding thereto an oxidizing compound capable of exerting a decolorizing action, a soluble aluminum salt of an acid stronger than carbonic acid to form a floc with the natural and added impurities and at least one stabilizing agent for said floc selected from the group consisting of:—a soluble silicate, a basic soluble phosphate—, said reagents being added to the liquor at substantially the same time, and in proportions to maintain the saccharine solution at a pH between 6 to 9, and thereafter removing the floc from the solution.

4. The process of purifying saccharine liquors containing the natural organic and inorganic impurities, which comprises adding thereto an alkaline earth oxidizing compound capable of exerting a decolorizing action, a soluble aluminum salt of an acid stronger than carbonic acid to form a floc with the natural and added impurities and at least one stabilizing agent for said floc selected from the group consisting of:— a soluble silicate, a basic soluble phosphate—, said reagents being added to the liquor at substantially the same time, and in proportions to maintain the saccharine solution at a pH between 6 to 9, and thereafter removing the floc from the solution.

5. The process of purifying saccharine liquors containing the natural organic and inorganic impurities, which comprises adding thereto, calcium hypochlorite, an aluminum salt of an acid stronger than carbonic acid, a soluble aluminate and at least one stabilizing agent selected from the group consisting of:—a soluble silicate, a basic soluble phosphate—, said reagents being added to the liquor at substantially the same time, and in proportions to maintain the saccharine solution at a pH between 6 to 9, and thereafter removing the floc formed by the reagents with the natural and added impurities of the liquors from the solution.

6. The process of purifying saccharine liquors containing the natural organic and inorganic impurities, which comprises adding thereto an peroxide compound capable of exerting a decolorizing action, a soluble aluminum salt of an acid stronger than carbonic acid to form a floc with the natural and added impurities, and at least one stabilizing agent for said floc selected from the group consisting of:—a soluble silicate, a basic soluble phosphate—, said reagents being added to the liquor at substantially the same time, and in proportions to maintain the saccharine solution at a pH between 6 to 9, and thereafter removing the floc from the solution.

7. The process of purifying saccharine liquors containing the natural organic and inorganic impurities which comprises adding thereto an inorganic peroxide compound capable of exerting a decolorizing action, a soluble aluminum salt of an acid stronger than carbonic acid to form a floc with the natural and added impurities, and at least one stabilizing agent for said floc selected from the group consisting of:—a soluble silicate, a basic soluble phosphate—, said reagents being added to the liquor at substantially the same time, and in proportions to maintain the saccharine solution at a pH between 6 to 9, and thereafter removing the floc from the solution.

8. The process of purifying saccharine liquors containing the natural organic and inorganic impurities, which comprises adding thereto, hydrogen peroxide compound capable of exerting a decolorizing action, a soluble aluminum salt of an acid stronger than carbonic acid to form a floc with the natural and added impurities, and at least one stabilizing agent for said floc selected from the group consisting of:—a soluble silicate, a basic soluble phosphate—, said reagents being added to the liquor at substantially the same time, and in proportions to maintain the saccharine solution at a pH between 6 to 9, and thereafter removing the floc from the solution.

9. The process of purifying saccharine liquors containing the natural organic and inorganic impurities, which comprises adding thereto in very small amounts, hydrogen peroxide, an aluminum salt of an acid stronger than carbonic acid, a soluble aluminate, and at least one stabilizing agent selected from the group consisting of:—a soluble silicate, a basic soluble phosphate—, said reagents being added to the liquor at substantially the same time, and in proportions to maintain the saccharine solution at a pH between 6 to 9, and thereafter removing the floc formed by the reagents with the natural and added impurities of the liquors from the solution.

JOHN P. IOANNU.